United States Patent Office 3,252,945
Patented May 24, 1966

3,252,945
POLYMERIZATION OF ISOCYANATES UTILIZING AN AMIDINE, TETRAZOLE, CYANAMIDE OR A RELATED COMPOUND AS THE CATALYST
Ivar Ugi and Wolfram Neumann, Leverkusen, Germany, assignors to Farbenfabriken Bayer Aktiengesellschaft, Leverkusen, Germany, a German corporation
No Drawing. Filed June 14, 1963, Ser. No. 287,748
Claims priority, application Germany, June 26, 1962,
F 37,161
2 Claims. (Cl. 260—77.5)

The present invention relates to isocyanates and more particularly to the preparation of polymers thereof.

It is known to produce isocyanurates by the trimerization of isocyanates using various basic catalysts, such as, for example, tertiary amines and alkali metal salts of carboxylic acids. This trimerization reaction is of particularly high interest industrially and the reaction can be carried out until the desired degree of polymerization has been reached by merely adding an acid to the reaction mixture which will deactivate the catalyst or by lowering the reaction temperature. However, upon the addition of an acid which deactivates the catalyst, a salt will usually form in the reaction mixture which, if allowed to remain, can cause serious problems in the final product.

It is therefore an object of this invention to provide a process for producing isocyanate polymers which are devoid of the foregoing disadvantages. It is another object of this invention to provide improved catalysts for use in the production of isocyanate polymers. It is still another object of this invention to provide improved isocyanate polymers. It is a further object of this invention to provide isocyanate polymers having uretdione and isocyanurate linkages. It is still a further object of this invention to provide a process for the production of isocyanate polymers having uretdione and isocyanurate linkages.

The foregoing objects and others which will become apparent from the following description are accomplished in accordance with this invention, generally speaking, by providing a process for the polymerization of isocyanates which comprises carrying out the polymerization reaction in the presence of at least a catalytic amount of a salt which contains anions which contain negatively charged nitrogen atoms. The anions of the present invention can be derived from compounds which can be tautomerised and which contain at least two nitrogen atoms such as, for example, hydrazoic acid, acidic heterocyclic compounds containing at least two nitrogen atoms, acidic compounds which contain several heterocyclic radicals each with at least two nitrogen atoms, cyanamides and amidines. Any anion having negatively charged nitrogen atoms can be used in accordance with the present invention.

The anions of the present invention can be looked at as either having the formula

or containing the grouping

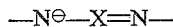

in the molecule wherein X in another N-atom or a CR group in where R represents a hydrogen atom or an alkyl or aryl radical. The alkyl radical is preferred to have 1 to 6 carbon atoms and includes benzyl. The aryl radical is preferred to be a phenyl radical which may be substituted by lower alkyl groups. The grouping is on both sides connected to organic residues which can close a ring to form a heterocyclic system with at least two nitrogen atoms.

Along with the anion derived from hydrazoic acid, those anions derived from heterocyclic compounds containing at least two nitrogen atoms and from compounds containing several heterocyclic radicals each with at least two nitrogen atoms can be used, such as, for example, tetrazole, 5-alkyl tetrazoles, 5-aryl tetrazoles, such as for example, 5-phenyl tetrazole, 5-(p-chlorophenyl)-tetrazole, 1,4-di-(5-tetrazolyl)benzene, benzimidazole, benztriazole and the like. The alkyl group in the tetrazoles can be for instance methyl, ethyl, butyl, but also stearyl and benzyl. The aryl group in the tetrazoles can be for instance a phenyl or a naphthyl group which may have chloro or lower alkyl such as methyl substituents. Any anion derived from any suitable cyanamide such as, for example, benzylcyanamide, ethyl cyanamide, methyl cyanamide, p-chlor-phenyl cyanamide, phenyl cyanamide, p-nitrophenyl cyanamide, p-chloro-phenyl-diazocyanamide and the like can be used. Any suitable anion derived from an amidine such as, for example, N,N'-diphenylacetamidine, N,N'-diethylpropionamidine, N,N'-diphenylbenzamidine and the like can be used.

The cations of the salts contemplated by this invention can be derived from monovalent or polyvalent metals or from organic bases. However, the cations derived from monovalent metals are preferred. Any suitable cation may be used, such as, for example, $Li^+$, $Na^+$, $K^+$, $Mg^{++}$, $Ca^{++}$, $(C_2H_5)_4N^+$, $(C_4H_9)_4N^+$, $$C_6H_5—N(CH_3)_3^+$$

$(CH_3)_3N^+—(CH_2)_4—N^+(CH_3)_3$, $(C_6H_5)_3PCH_3^+$ and the like.

Any suitable salt containing an anion having negatively charged nitrogen atoms as set forth hereinbefore can be used in the practice of the present invention, such as, for example, lithium azide, sodium-5-phenyltetrazole, tetraethylammonium azide, sodium azide, potassium azide, lithium-p-tolyltetrazole, potassium-p-chlorophenyltetrazole, sodium benzimidazole, lithium benzylcyanamide, sodium diphenylbenzamidine and the like.

The invention broadly contemplates any catalytic amount of the catalyst but ordinarily from about 0.001 percent to about 5 percent and preferably from about 0.01 percent to about 0.5 percent based on the reaction mixture should be used for best results. It is preferred to add the catalyst to the starting material and can be added, if desired, in a dissolved form.

Any suitable monovalent and/or polyvalent isocyanate can be polymerized in accordance with the present invention, such as, for example, phenyl isocyanate, o-, m-, and p-tolyl isocyanates, p-chlorophenyl isocyanate, p-nitrophenyl isocyanate, p-naphthyl isocyanate, 1,6-hexane diisocyanate, o-, m-, and p-phenylene diisocyanates, 2,4- and 2,6-toluylene diisocyanates, 1,6-hexamethylene diisocyanate, m-xylylene diisocyanate, p-xylylene diisocyanate, 4,4-dimethyl-1,3-xylylene diisocyanate, cyclohexane-1,4-diisocyanate, dicyclohexyl-methane-4,4'-diisocyanate, 4,4'-diphenylmethane diisocyanate and 1,5 - naphthylene diisocyanate, 4,4',4" - triphenylmethane triisocyanate, 4,4',4" - triphenyl phosphate triisocyanate, 4,4',4",4"'-tetraphenylmethane tetraisocyanate, mixtures thereof and the like. However, for carrying out the polymerization process, not only the aforementioned monomeric isocyanates of low molecular weight can be used, but also compounds of higher molecular weight are suitable such as, for example, those isocyanates containing three isocyanate groups as well as compounds which contain masked isocyanate groups such as, for example, compounds which are the reaction products of about 1 mol of a trihydric alcohol with about 3 mols of a diisocyanate such as, for example, toluylene diisocyanate.

Any suitable isocyanate may be used in the practice of the present invention, such as, for example, those mentioned hereinbefore along with any organic compound such as, for example, the reaction product of an excess of an organic diisocyanate with an organic compound containing active hydrogen containing groups in the molecule, the active hydrogen containing groups being reactive with isocyanate groups. These compounds may be obtained by reacting an excess of an organic polyisocyanate with any suitable compound containing active hydrogen containing groups which are reactive with isocyanate groups. The ratio of the isocyanate groups to the active hydrogen containing groups is from about 1.2:1 to about 3.0:1 depending upon the molecular weight of the reaction product desired.

By the term "componud containing active hydrogen containing groups" is meant any compound which gives a positive Zerewitinoff test. In other words, any chemical which when added to a Grignard solution of methyl iodide, will liberate methane by decomposition of the Grignard reagent.

Any suitable compound containing active hydrogen containing groups which are reactive with isocyanate groups may be used in the reaction with an organic diisocyanate, such as, for example, hydroxyl polyesters, polyhydric polyalkylene ethers, polyhydric polyalkylene thioethers, polyester amides, polyacetals, and organic compounds containing activated methylene groups.

Any suitable hydroxyl polyester may be used in the reaction with a monomeric diisocyanate such as, for example, the reaction product of a polycarboxylic acid and a polyhydric alcohol. Any suitable polycarboxylic acid may be used such as; for example, succinic, oxalic, adipic, methyladipic, sebacic, glutaric, pimelic, azelaic, suberic acid and the like; aromatic carboxylic acids including phthalic, terephthalic, isophthalic, 1,2,4-benzene tricarboxylic acid and the like; sulfur containing acids such as thiodiglycolic, thiodipropionic acid and the like; unsaturated acids such as, for example, maleic, fumaric, itaconic, citraconic acid, mixtures thereof and the like. Any suitable polyhydric alcohol may be used, such as, for example, ethylene glycol, propylene glycol, butylene glycol, 1,6-hexane-diol, trimethylolpropane, pentaerythritol, and the like.

Any suitable polyester amide may be used in the reaction with an isocyanate, such as, for example, the reaction product of an amine and/or amino alcohol with a polycarboxylic acid. Any suitable amine such as, for example, ethylene diamine, propylene diamine and the like may be used. Any suitable amino alcohol such as, for example, $\beta$-hydroxyethylamine and the like may be used. Any suitable polycarboxylic acid may be used, such as, for example, those more particularly disclosed above for the preparation of the hydroxyl polyesters.

Any suitable polyhydric polyalkylene ether may be used to prepare a high molecular weight diisocyanate by reaction with a monomeric diisocyanate such as, for example, the condensation product of an alkylene oxide with a small amount of a compound containing active hydrogen containing groups such as, for example, water, ethylene glycol, propylene glycol, butylene glycol, amylene glycol, trimethylolpropane, glycerine, pentaerythritol, hexanetriol and the like. Any suitable alkylene oxide condensate may be used such as, for example, ethylene oxide, propylene oxide, butylene oxide, amylene oxide, or mixtures thereof. The polyhydric polyalkylene ethers may be prepared by any known process such as, for example, the process described by Wurtz in 1859 and in "Encyclopedia of Chemical Technology," volume I, pages 257 to 262, published by Interscience Publishers, Inc., 1951, or in U.S. Patent 1,922,459, issued to Otto Schmidt et al., August 15, 1933.

Any suitable polyhydric polyalkylene thioether may be used in the reaction with a monomeric diisocyanate such as, for example, the reaction product of one of the aforementioned alkylene oxides used in the preparation of the polyhydric polyalkylene ethers with a polyhydric thioether such as, for example, thiodiglycol, 3,3'-dihydroxypropyl sulfide, 4,4'-dihydroxybutyl sulfide, 1,4-(beta hydroxyethyl) phenylene dithioether and the like.

Any suitable polyacetal may be used in the reaction with an isocyanate such as, for example, the reaction product of an aldehyde with a polyhydric alcohol. Any suitable aldehyde may be used, such as, for example, formaldehyde, paraldehyde, butyraldehyde, and the like. Any of the polyhydric alcohols mentioned above in the preparation of the hydroxyl polyesters may be used.

Any suitable organic compound containing activated methylene groups may be reacted with a polyisocyanate to obtain the organic compound having at least two isocyanate groups such as, for example, compounds containing enolizable hydrogen atoms such as, for example, aceto acetic ester, diethyl malonate, methyl-m-butyl malonate, acetyl acetone, acetonyl acetone and the like.

The organic compound can also be prepared by copolymerizing an unsaturated isocyanate such as, for example, 2,3-butenyl-1,4-diisocyanate or allyl isocyanate with another unsaturated product such as, for example, unsaturated polyesters which may be prepared by reacting any of the polyhydric alcohols mentioned above with respect to the preparation of suitable hydroxyl polyesters with an unsaturated difunctional carboxylic acid such as, for example, maleic acid, fumaric acid, itaconic acid, citraconic acid and the like. The unsaturated isocyanate can then be copolymerized through the double bonds to obtain the organic compound having terminal isocyanate groups.

The polymerization reaction of the isocyanates in the presence of a catalyst according to the present invention can be performed at a temperature of from about −50° C. to about +200° C. and preferably at a temperature of from about 0° C. to about 130° C.

A solvent can also be employed during the reaction providing the solvent does not react with the isocyanate. Any suitable solvent may be used, such as, for example, chloroform, methylene chloride, ethyl acetate, butyl acetate, acetic acid ethyl ester, dimethyl formamide, chlorobenzene, dichlorobenzene, methyl glycol acetate, and the like.

The process of the present invention can be modified in substantially all cases where reactions with isocyanates are carried out, such as, for example, enlargements of the molecule, cross linking reactions and the like. Moreover, compounds which contain urethane, urea, biuret, allophanate groups and the like, such as, for example, those which are at least in part split back into isocyanate groups when heated, lead to a different type of molecular structure upon adding the catalysts according to the present invention. The possibilities of variations with the new catalysts are very numerous. For example, film-forming materials of linear or branched polyesters containing hydroxy groups can be reacted or cross linked with an excess of diisocyanate and, instead of the hitherto usual cross linking reactions, the polyhydroxy compounds can be wholly or at least in part transformed by means of the new catalysts into a cross linked state. The same method of procedure can also be used on the reaction products of polyethers containing hydroxy groups and polyisocyanates in the presence of water during the manufacture of soft and hard foams and for accelerating the adhesive action of polyisocyanates.

In the reaction according to the present invention, there are formed, inter alia, polymers which contain uretdione and isocyanurate groups as structural elements. The polymers might also contain carbodiimide groupings and their secondary polymers. It is also probable that some of the isocyanate groups react with linear polymerization. If the polymerization reaction is completed, products are formed which do not contain free isocyanate groups. However, it is also possible to stop the polymerization reaction before it has reached completion by the addition of an acid, such as, for example, hydrohalic acids, carboxylic acids, carboxylic acid chlorides and the like which act as a deactivator for the catalyst. The reaction can also be stopped by lowering the reaction temperature. In each of these instances where the reaction is stopped before it has reached completion, products which contain free isocyanate groups are obtained. The products containing free isocyanate groups can be used in polyaddition reactions with polyhydroxy compounds or other compounds which contain active hydrogen atoms which are reactive with isocyanate groups. These polyaddition reactions can be carried out in the presence of water or other foaming or cross linking agents.

The isocyanate polymers which are prepared in accordance with the present invention are not only useful in polyaddition reactions for the preparation of all types of polyurethanes but are also useful as valuable intermediates and as components for lacquers and binding agents.

The invention is further illustrated by the following examples in which parts are by weight unless otherwise specified.

*Example 1*

A solution of about 0.1 part of lithium azide in about 100 parts of dimethyl formamide is mixed with about 100 parts of phenyl isocyanate and heated for about 4 hours at about 50° C. After cooling to about 0° C., the crystal magma is suction filtered, washed with benzene/light benzine and dried in vacuo. Yield: 87 g. Melting point: about 144 to about 167° C.

According to the infra-red spectrum, the reaction product consists of a mixture of diphenyl uretdione and triphenyl isocyanurate in a ratio of about 10:1.

*Example 2*

A solution of about 0.1 part of sodium-5-phenyltetrazole in about 2 parts of dimethyl formamide is introduced into about 100 parts of a mixture of 2,4- and 2,6-toluylene diisocyanate (70:30 isomeric mixture) at approximately 20° C. After standing for about 4 days at about 20° C., the reaction mixture permeated by crystals has about 100 parts of benzene/light benzine added thereto and is suction-filtered. This reaction yields about 42 parts of crude 1,3-bis-(4'-methyl-3'-isocyanato-phenyl)-uretdione with a melting point of about 133–140° C.

*Example 3*

A mixture of about 0.1 part of sodium-5-phenyltetrazole, about 30 parts of dimethyl formamide, about 70 parts of ethyl acetate and about 100 parts of 2,4-toluylene diisocyanate is heated for about 2 hours under reflux. After cooling to about 20° C., one part of concentrated hydrochloric acid is added while stirring. The viscous pale yellow solution has an isocyanate content of about 6.7% by weight, i.e., about 28% of the —NCO groups originally present.

*Example 4*

A mixture of about 0.2 part of lithium azide, about 100 parts of 2,4-toluylene diisocyanate and about 50 parts of dimethyl formamide is heated to about 110° C. With violent evolution of carbon dioxide and a spontaneous rise in temperature to about 173° C., a pale yellow diisocyanate polymer solid at room temperature is formed. This polymer according to the infra-red spectrum contains neither isocyanate nor carbodiimide groups.

*Example 5*

About 200 parts of a polyester of adipic acid and ethylene glycol (having an OH number of about 56) are dehydrated at about 130° C. in vacuo and about 25 parts of 4,4'-diphenyl methane diisocyanate are added thereto while stirring at about 100° C. After about 10 minutes, a solution of about 0.1 part of lithium azide in about 2 parts by volume of dimethyl formamide is introduced. The mixture is poured onto a metal mold and finally heated for about 12 hours at about 110–120° C. An elastic cross-linked synthetic plastic is formed.

It is to be understood that this invention is not limited by the examples, but that any of the compositions mentioned herein as typical for use in the present invention may be used in place of those set forth in the examples with similar results.

Although the invention has been described in considerable detail in the foregoing, it is to be understood that such detail is solely for this purpose of illustration and that many variations can be made by those skilled in the art without departing from the spirit and scope of the invention except as set forth in the claims.

What is claimed is:

1. A process for reacting the NCO groups of organic NCO containing compounds which comprises polymerizing NCO groups at a temperature between about —50° C. to about 200° C. in the presence of a catalytic amount of a salt containing anions derived from a member selected from the group consisting of hydrazoic acid, tetrazole, 5-methyl tetrazole, 5-ethyl tetrazole, 5-butyl tetrazole, 5-stearyl tetrazole, 5-benzyl tetrazole, 5-phenyl tetrazole, 1,4-di-(5-tetrazolyl)-benzene, 5-naphthyl tetrazole, benzylcyanamide, ethyl cyanamide, methyl cyanamide, p-chlorophenyl cyanamide, p-nitrophenyl cyanamide, phenyl cyanamide, p-chlorophenyl diazocyanamide, N,N'-diphenyl acetamidine, N,N'-diethylpropionamidine, and N,N'-diphenylbenzamidine and cations derived from a member selected from the group consisting of Li$^+$, Na$^+$, K$^+$, $Mg^{++}$, $Ca^{++}$, $(C_2H_5)_4N^+$, $(C_4H_9)_4N^+$ $C_6H_5$—$N(CH_3)_3{}^+$, $(CH_3)_3N^+$—$(CH_2)_4$—$N^+(CH_3)_3$ and $(C_6H_5)_3PCH_3{}^+$.

2. The process of claim 1 wherein the phenyl tetrazole and the naphthyl tetrazole are substituted with a member selected from the group consisting of chlorine and methyl substituents.

References Cited by the Examiner

UNITED STATES PATENTS 2,965,614  12/1960  Shashoua _____ 260—77.5
2,993,870   7/1961  Burkus _____ 260—77.5

LEON J. BERCOVITZ, *Primary Examiner.*

M. C. JACOBS, *Assistant Examiner.*